United States Patent [19]

Cloyd

[11] Patent Number: 4,696,524
[45] Date of Patent: Sep. 29, 1987

[54] ROBOT ARM COUPLING APPARATUS

[75] Inventor: William C. Cloyd, Lexington, Ky.

[73] Assignees: Custom Tool & Mfg. Co.; Automation Development Corporation, both of Lexington, Ky.; part interest to each

[21] Appl. No.: 835,520

[22] Filed: Mar. 3, 1986

[51] Int. Cl.$^4$ .................................... H01R 13/62
[52] U.S. Cl. .................................... 439/197; 439/348
[58] Field of Search ............... 339/15, 16 R, 48, 49 B, 339/75 R, 75 M, 91 B; 403/368, 369; 279/22, 29, 30, 82

[56] References Cited

U.S. PATENT DOCUMENTS

| | | | |
|---|---|---|---|
| 2,728,062 | 12/1955 | Klostermann | 339/48 |
| 3,118,713 | 1/1964 | Ellis | 339/75 R |
| 3,684,303 | 8/1972 | Serra | 279/82 |
| 3,771,099 | 11/1973 | Dinse | 339/16 R |
| 4,304,452 | 12/1981 | Kiefer | 339/75 M |
| 4,652,203 | 3/1987 | Nakashima et al. | 414/730 |

OTHER PUBLICATIONS

IBM Technical Disclosure Bulletin, vol. 14, No. 10, 3/1972, "Fluidic Connector", Welnicki.

*Primary Examiner*—John McQuade
*Attorney, Agent, or Firm*—Frank C. Leach, Jr.

[57] ABSTRACT

A robot arm has a tool connected thereto through a coupling apparatus including an inner assembly attached to the robot arm and an outer assembly attached to the tool. When the inner assembly has its outer surface mating with an inner surface of the outer assembly, a piston in the inner assembly is pneumatically moved to lock the inner and outer assemblies to each other. The piston movement causes radial movement of balls, which are mounted in a retainer of the inner assembly, away from the piston so that the balls will be retained beneath a cam locking ring of the outer assembly whereby the inner and outer assemblies remain locked when the pneumatic pressure is removed. The outer surface of the outer assembly has a mounting plate for attachment to the tool to be connected to the robot arm. When the inner and outer assemblies are locked to each other, a plurality of electrical pins in the inner assembly engages electrical pins in the outer assembly to provide electrical connections extending through the inner and outer assemblies. The outer assembly has a plurality of hollow resilient bodies mounted therein with each having a portion extending beyond the inner surface of the outer assembly for disposition within an enlarged recess in a passage extending through the inner assembly so that the resilient body forms a seal with the inner assembly to provide a plurality of pressurized air passages through the inner and outer assemblies.

20 Claims, 6 Drawing Figures

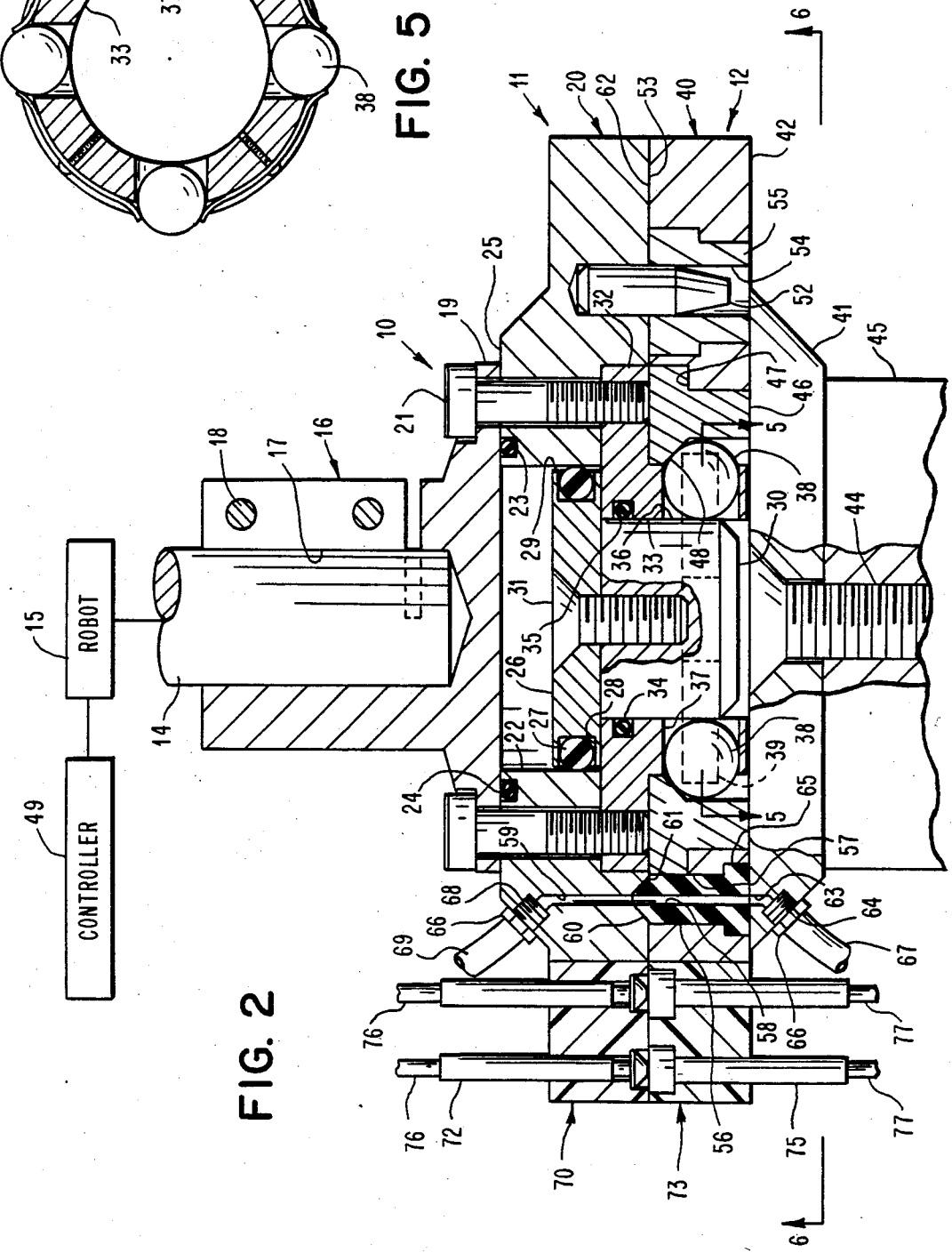

ROBOT ARM COUPLING APPARATUS

This invention relates to a quick coupling apparatus and, more particularly, to a quick coupling apparatus for quickly connecting and disconnecting a tool or the like and a robot arm.

One use of a robot is to have it perform a plurality of operations on a workpiece at a station with each operation utilizing a different tool. In this process, it is desired for the arm of the robot to be able to be quickly connected to and disconnected from each of the plurality of tools in the correct sequence. It also is necessary for there to be both electrical and pneumatic connections to each of the tools when the tool is connected to the robot arm so that the robot may control the operation of the tool by electrical and pneumatic signal.

It also may be desired to employ a robot to perform the same operation at a work station for a long period of time, for example, and then to change to another tool. Again, it is desired to have a quick connect and disconnect between the tool and the robot arm to reduce the down time. This also requires the electrical and pneumatic connections between the robot and the tool to enable the robot to control the tool.

For safety purposes, it is necessary for the tool to remain mechanically locked or latched to the robot arm without the requirement of any external force after the tool is locked or latched to the robot arm. This prevents any possibility of release of the tool from the robot arm due to power failure, for example.

It also is desired for the coupling apparatus connecting the tool and the robot arm to enable separation of the tool from the robot arm without any force having to be applied to the tool. That is, no pushing apart is required to separate the tool from the robot arm.

The apparatus of the present invention meets these requirements through connecting a tool to a robot arm so that pneumatic passages and electrical connections are automatically provided to extend through the coupling apparatus when the tool is connected to the robot arm. Thus, this enables pneumatic signals to be supplied from the robot controlller to the tool actuator and electrical signals to be transmitted to the robot controller from a sensor or sensors associated with the tool.

The apparatus of the present invention includes an inner assembly and an outer assembly with the inner assembly attached to the robot arm and the outer assembly attached to the tool. When the inner and outer assemblies are mechanically locked to each other, pneumatic passages and electrical connections are produced automatically. The locking arrangement is such that the assemblies stay locked even when the force which causes locking of the assemblies to each other is removed. Thus, unlocking of the two assemblies can occur only with the application of force.

Additionally, the inner and outer assemblies of the coupling apparatus separate from each other during unlocking without any force being applied to either of the assemblies. Therefore, when the tool is returned by the robot to its storage position, release of the locking of the assemblies to each other occurs without any pushing force between the two assemblies. The tool separates from the robot arm by gravity upon release of the mechanical locking means.

An object of this invention is to provide a coupling apparatus for quickly connecting and disconnecting a tool or the like and a robot arm.

Another object of this invention is to provide a coupling apparatus in which the two coupled assemblies are separated without application of any force to either of the two coupled assemblies.

A further object of this invention is to provide a coupling apparatus having a unique locking mechanism for locking a tool or the like and a robot arm to each other.

Still another object of this invention is to provide a coupling apparatus for connecting a tool or the like to a robot arm in which a unique sealing arrangement is employed for the pneumatic passages.

Other objects of this invention will be readily perceived from the following description, claims, and drawings.

This invention relates to an apparatus for connecting a tool or the like to a robot arm including an inner assembly, means to attach the inner assembly to a robot arm, and an outer assembly including means for attachment to a tool or the like. Locking means, which locks the outer assembly to the inner assembly, includes means slidably supported by the inner assembly, first means to cause movement of the slidably supported means to move the slidably supported means to its locking position with the slidably supported means remaining in the locking position after the first means is rendered ineffective, and second means to cause movement of the slidably supported means to remove the slidably supported means from the locking position. The locking means also includes a plurality of balls surrounding the slidably supported means and supported by the inner assembly, a cam locking ring supported by the outer assembly and having means cooperating with the balls to retain the balls to lock the outer assembly to the inner assembly when the first means of the locking means moves the slidably supported means to the locking position and resilient means supported by the inner assembly to move the balls out of retention by the cam locking ring when the second means of the locking means removes the slidably supported means from the locking position. Each of the inner assembly and the outer assembly has electrical means cooperating with each other to provide a plurality of electrical connections extending through the inner assembly and the outer assembly when the inner assembly and the outer assembly are locked to each other by the locking means. Each of the inner assembly and the outer assembly has air passage means cooperating with each other to provide a plurality of air sealed passage means extending through the inner assembly and the outer assembly when the inner assembly and the outer assembly are locked to each other by the locking means.

This invention also relates to an apparatus for connecting a tool or the like to a robot arm including an inner assembly, means to attach the inner assembly to a robot arm, and an outer assembly including means for attachment to a tool or the like. Locking means locks the outer assembly to the inner assembly. Each of the inner assembly and the outer assembly has electrical means cooperating with each other to provide a plurality of electrical connections extending through the inner assembly and the outer assembly when the inner assembly and the outer assembly are locked to each other by the locking means. One of the inner assembly and the outer assembly has a plurality of passages extending therethrough, and the other of the inner assembly and the outer assembly has a plurality of hollow elements extending therethrough. Each of the hollow elements has a passage extending therethrough and aligned with one of the passages in the one of the inner assembly and the outer assembly when the inner assembly and the outer assembly are locked to each other by the locking means. Each of the hollow elements is formed solely of a resilient material and has a portion extending beyond the other of the inner assembly and the outer assembly. Each of the passages in the one of the inner assembly and the outer assembly has means to receive the extending portion of the hollow element when the inner assembly and the outer assembly are locked to each other by the locking means to form a seal therebetween so that a plurality of air sealed passages extends through the inner assembly and the outer assembly.

The attached drawings illustrate a preferred embodiment of the invention, in which:

FIG. 2 is a sectional view, partly in elevation and partly schematic, of the coupling apparatus of FIG. 1 and taken along line 2—2 of FIG. 1 with the robot arm and the air hoses and fittings added;

FIG. 5 is a sectional view of a ball retainer of the inner assembly of the coupling apparatus and taken along line 5—5 of FIG. 2.

Figure 1:
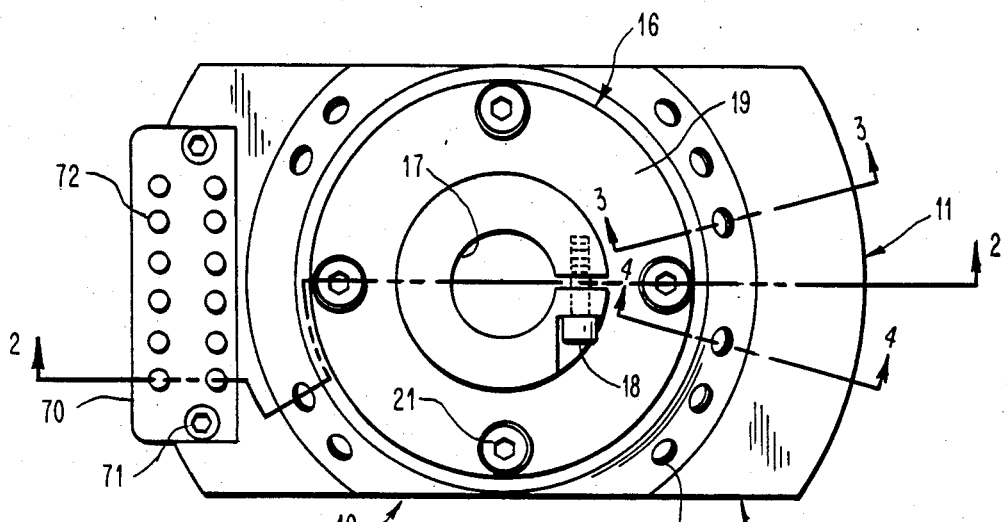
FIG. 1 is a top plan view of a coupling apparatus of the present invention.

Referring to the drawings and particularly FIG. 1, there is shown a coupling apparatus 10. The coupling apparatus 10 includes an inner assembly 11 (see FIG. 2) and an outer assembly 12 adapted to be quickly connected to each other and to be quickly disconnected from each other.

The inner assembly 11 is connected to a robot arm 14 of a robot 15. An adapter clamp 16 has a recess 17 to receive the end of the robot arm 14 to clamp the robot arm 14 to the inner assembly 11. The adapter clamp 16, which is attached to the robot arm 14 by screws 18 cooperating with portions of the adapter clamp 16, has a circular base 19 attached to a body 20 of the inner assembly 11 by Allen screws 21.

The body 20 has a sealed chamber 22 therein with one end closed by the base 19 of the adapter clamp 16. The body 20 has an O-ring 23 mounted in a groove 24 in its inner surface 25 and cooperating with the base 19 of the adapter clamp 16 to form a seal therebetween.

A piston 26 of circular cross section is slidably disposed within the chamber 22 and has an O-ring 27 mounted in a groove 28 in its circumferential surface 29, which is spaced from the wall of the chamber 22 in the body 20. Thus, the O-rings 24 and 27 form a seal for a piston of the chamber 22.

The piston 26 has a piston rod 30 of circular cross section attached thereto by a screw 31. When the piston 26 is moved outwardly from the base 19 of the adapter clamp 16, the motion of the piston 26 is stopped by the piston 26 engaging a ball retainer 32, which is secured to the body 20 by the Allen screws 21. The ball retainer 32 has an inner round cylindrical passage 33 to receive the piston rod 30. An O-ring 34 in a groove 35 of the ball retainer 32 rubs against circumferential surface 36 of the piston rod 30 to form a seal therewith. Therefore, the O-rings 27 and 34 form a seal for a portion of the chamber 22.

The ball retainer 32 has a plurality of passages 37 extending radially from the passage 33. Each of the radial passages 37 receives a ball 38.

As shown in FIG. 5, the ball retainer 32 has a plurality of resilient strips 39 mounted thereon in a groove 39' with the ends of each of the strips 39 acting against the balls 38 to urge the balls 38 inwardly continuously. Each of the strips 39 has its ends overlying the outer ends of adjacent of the radial passages 37.

When the piston 26 is in the locking position of FIG. 2, the balls 38 are urged against the circumferential surface 36 of the piston rod 30 by the strips 39. Therefore, there is only a radial force on the piston rod 30 and no axial force on the piston rod 30 when the outer assembly 12 is locked to the inner assembly 11.

Figure 6:
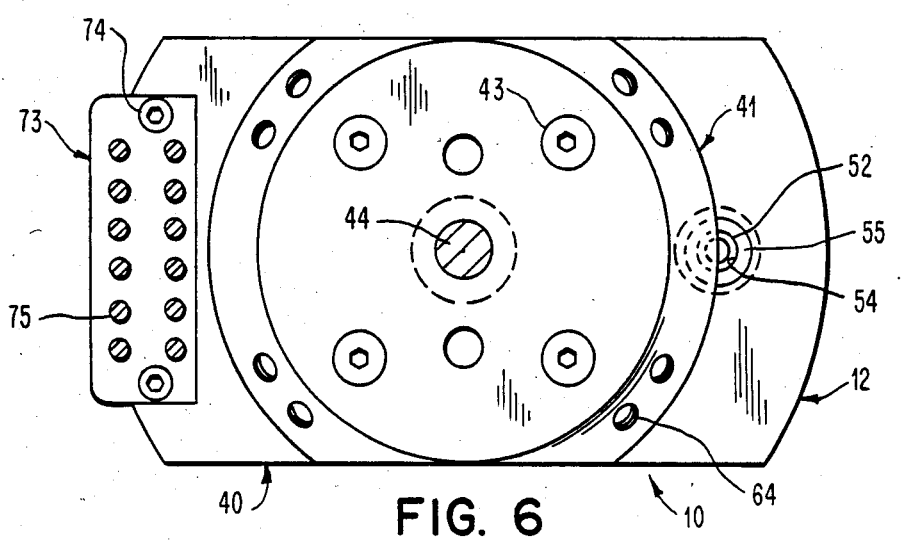
FIG. 6 is a bottom plan view, partly in section, of the coupling apparatus and taken along line 6—6 of FIG. 2.

The outer assembly 12 includes a body 40 having a mounting plate 41 attached to its outer surface 42 by Allen screws 43 (see FIG. 6). The mounting plate 41 has a screw 44 (see FIG. 2) attaching the mounting plate 41 to a tool 45 that is to be connected by the coupling apparatus 10 to the robot arm 14.

The body 40 has a cam locking ring 46 mounted in a recess 47 of the body 40. The cam locking ring 46 has a beveled or angled surface 48 cooperating with the balls 38 in the radial passages 37 in the ball retainer 32 to cam the balls 38 underneath the beveled surface 48 when the piston 26 is moved to the locking position of FIG. 2 in which the inner assembly 11 and the outer assembly 12 are locked to each other.

Figure 3:
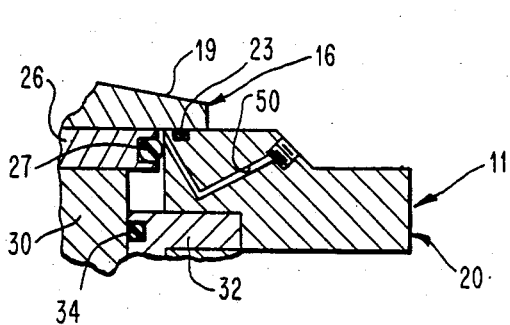
FIG. 3 is a fragmentary sectional view of a portion of an inner assembly of the coupling apparatus showing a pressurized air passage for applying a force to a piston in its unlocking position to move the piston to lock the inner and outer assemblies of the coupling apparatus and taken along line 3—3 of FIG. 1.

The piston 26 is moved to the position of FIG. 2 by the application of pressurized air from a source under control of a controller 49 of the robot 15. The pressurized air is supplied through a passage 50 (see FIG. 3) in the body 20 of the inner assembly 11. The pressurized air acts on the O-ring 27 since the circumferential surface 29 (see FIG. 2) of the piston 26 is spaced from the wall of the chamber 22 in the body 20.

When the piston 26 reaches the position of FIG. 2 so that the balls 38 are beneath the beveled surface 48 of the cam locking ring 46, the pressurized air is removed from acting on the piston 26 by the controller 49 of the robot 15. The piston 26 will remain in this locking position without any force because of the balls 38 being locked beneath the beveled surface 48 of the cam locking ring 46. Thus, no force is required to maintain the inner assembly 11 and the outer assembly 12 in the locked or latched position.

Figure 4:
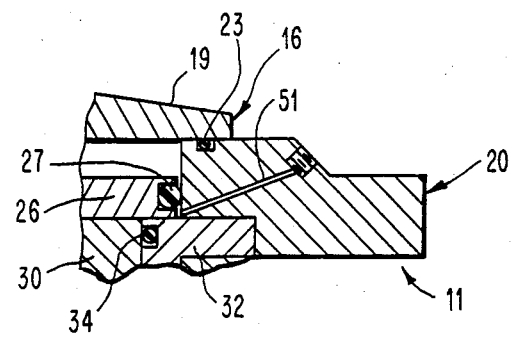
FIG. 4 is a fragmentary sectional view of a portion of the inner assembly of the coupling apparatus showing a pressurized air passage for applying a force to a piston in its locking position to move the piston to unlock the inner and outer assemblies of the coupling apparatus and taken along line 4—4 of FIG. 1.

When the inner assembly 11 and the outer assembly 12 are to be unlocked, pressurized air is supplied through a passage 51 (see FIG. 4) in the body 20 of the outer assembly 11. This pressurized air also acts on the O-ring 27 because of the spacing of the circumferential surface 29 (see FIG. 2) of the piston 26 from the wall of the chamber 22. As the piston 26 is moved towards the adapter clamp 16, the resilient strips 39 move the balls 38 out of the cam locking ring 46 of the body 40 of the outer assembly 12 by their continuous forces so that there is no locking of the outer assembly 12 to the inner assembly 11. As a result, the inner assembly 11 is disconnected from the outer assembly 12 by gravity; the tool 45 would have been stowed in a support arrangement before the unlocking occurred so that the inner assembly 11 is moved away from the outer assembly 12 by the robot 15.

The body 20 of the inner assembly 11 has a guide or locator pin 52 extending beyond its outer surface 53. The guide or locator pin 52 extends into a passage 54 in a metallic bushing 55, which is mounted in the body 40 of the outer assembly 12. Accordingly, proper alignment of the inner assembly 11 and the outer assembly 12 is accomplished when the robot 15 positions the inner assembly 11 for cooperation with the outer assembly 12.

The body 40 of the outer assembly 12 has a plurality of hollow rubber bodies 56 mounted in passages 57 extending through the body 40. Each of the hollow bodies 56 has a passage 58 extending therethrough and of the same diameter as the passage 59 in the body 20 with which it is aligned when the guide or locator pin 52 enters the bushing passage 54.

Each of the hollow rubber bodies 56 has a cone shaped end 60 for disposition within an enlarged conical shaped recess 61 at the outer end of each of the passages 59 in the body 20. Thus, when the outer surface 53 of the body 20 mates with an inner surface 62 of the body 40, the cone shaped end 60 of the hollow rubber body 56 is engaging the wall of the recess 61 to form a seal therebetween. Therefore, pressurized air may be supplied through the passages 58 and 59 and be sealed at the mating or parting surfaces 53 and 62. Accordingly, sealing is accomplished without any force being required as with an O-ring, for example.

Each of the passages 58 in the hollow rubber bodies 56 communicates with a passage 63 in the mounting plate 41. The mounting plate 41 has a threaded hole 64 extending inwardly from its exterior and communicating with the passage 63.

Each of the hollow rubber bodies 56 has an enlarged end 65 abutting the mounting plate 41. The enlarged end 65 protrudes a slight amount such as 0.010", for example, beyond the outer surface 42 of the body 40 of the outer assembly 12 to form a seal with the passage 63 in the mounting plate 41.

The threaded hole 64 receives a barb fitting 66 to which a hose 67 is connected. The hose 67 leads to a clamp or actuator, for example, for the tool 45.

Each of the passages 59 in the body 20 of the inner assembly 11 terminates in a threaded hole 68 within which is threaded one of the barb fittings 66. Each of the barb fittings 66 has a hose 69 secured thereto and connected to the air source under control of the controller 49 of the robot 15.

Accordingly, pressurized air is supplied under control of the controller 49 of the robot 15 to the tool 45 attached to the mounting plate 41 of the outer assembly 12. Thus, when the inner assembly 11 and the outer assembly 12 are locked to each other, pressurized air can be supplied to the clamp or actuator of the tool 45 to enable the tool 45 to perform various desired operations in a desired sequence.

The inner assembly 11 has an electrically insulating block 70 secured to the body 20 by Allen screws 71 (see FIG. 1). The insulator block 70 has a plurality of spring contact pins 72 mounted therein. Each of the spring contact pins 72 is continuously urged beyond the outer surface 53 (see FIG. 2) of the inner assembly 11 when the inner assembly 11 is not locked to the outer assembly 12. One suitable example of the spring contact pins 72 is sold by Contact Products Inc., Pomona, Calif. as SPA-20 contact/SPR-2W-1 retainer.

The outer assembly 12 has an electrically insulating block 73 (see FIG. 6) secured to the body 40 by Allen screws 74. The electrically insulating block 73 has a plurality of stationary contact pins 75 mounted therein. One suitable example of the stationary contact pins 75 is sold by Contact Products Inc. as SPA-2F-modified.

Each of the stationary contact pins 75 is aligned with one of the spring contact pins 72 (see FIG. 2). Accordingly, when the inner assembly 11 and the outer assembly 12 are locked to each other, the stationary contact pins 75 are in engagement with the spring contact pins 72, which are pushed back into the electrically insulating block 70 as shown in FIG. 2.

Each of the spring contact pins 72 has a conductor 76 extending therefrom and connected to the controller 49 of the robot 15. Each of the stationary contact pins 75 has a conductor 77 connected thereto and extending therefrom for attachment to sensors such as position sensors, proximity sensors, or detection sensors, for example, of the tool 45. Therefore, when the inner assembly 11 and the outer assembly 12 are locked or latched to each other, electrical connections are provided between the controller 49 of the robot 15 and the sensors of the tool 45. This enables the desired electrical signals to be transmitted between the controller 49 of the robot 15 and the sensors of the tool 45.

Considering the operation of the present invention, the inner assembly 11 is positioned by the controller 49 of the robot 15 through movement of the robot arm 14 to dispose the inner assembly 11 adjacent the outer assembly 12 of the tool 45. This can be one of a plurality of the tools 45, which would be stored in suitable stowing means.

When the inner assembly 11 is at the desired position for locking the inner assembly 11 to the outer assembly 12 of the tool 45 that is to be controlled by the robot 15, pressurized air is supplied under control of the controller 45 of the robot 15 through the passage 50 (see FIG. 3) to cause sliding motion of the piston 26 (see FIG. 2) whereby the piston rod 30 is advanced through the passage 33 in the ball retainer 32 to cause radial movement of the balls 38 within the radial passages 37 in the ball retainer 32. As the piston 26 moves under pneumatic pressure, the balls 38 ride along the beveled surface 48 of the cam locking ring 46 until motion of the piston 26 is stopped by the piston 26 engaging the ball retainer 32 as shown in FIG. 2.

With the inner assembly 11 and the outer assembly 12 locked to each other in the position of FIG. 2, the controller 49 of the robot 15 removes the air pressure from the passage 50 (see FIG. 3) by venting it so that a force is no longer applied to the piston 26. However, because of the balls 38 (see FIG. 2) engaging the beveled surface 48 of the cam locking ring 46, which is secured to the body 40 of the outer assembly 12, there can be no inward motion of the piston 26 from the position shown in FIG. 2. While the resilient strips 39 continuously urge the balls 38 radially inwardly in the radial passages 37, the piston rod 30 prevents this radial inward movement of the balls 37. Thus, only a force normal to the axis of motion of the piston 26 is exerted on the piston 26 at this time. There is no force exerted along the axis of motion of the piston 26 at this time.

When it is desired to unlock the outer assembly 12 from the inner assembly 11, the controller 49 will move the robot arm 14 until the tool 45 is stored in the stowed means so that it will be supported when the outer assembly 12 is unlocked from the inner assembly 11. After this occurs, the controller 49 of the robot 15 causes pressurized air to be supplied to the passage 51 (see FIG. 4) in the body 20 of the inner assembly 11. This pneumatic pressure acts on the O-ring 27 to move the piston 26 inwardly away from the ball retainer 32. When the piston 26 has completed its motion through abutting the base 19 of the adapter clamp 16, the balls 38 (see FIG. 2) will be forced by the resilient strips 39 out of engagement with the beveled surface 48 of the cam locking ring 46. When this occurs, the controller 49 of the robot 15 produces a signal to have the robot arm 14 move to withdraw the inner assembly 11 from the outer assembly 12. Then, the controller 49 of the robot 15 will position the robot arm 14 so that the inner assembly 11 can cooperate with the outer assembly 12 attached to the next of the tools 45 to be used.

Accordingly, a plurality of the outer assemblies 12 is used with one of the inner assemblies 11. Each of the outer assemblies 12 is attached to a different one of the tools 45. The hole pattern in the mounting plate 41 is configured in accordance with the specific tool 45 to which the mounting plate 41 is attached; otherwise, the mounting plates 41 are the same for all of the tools 45.

An advantage of this invention is that the coupling is maintained between the robot arm and the tool connected thereto after all external force is removed. Another advantage of this invention is that no force is required on either of the assemblies to separate the connected assemblies of the coupling apparatus when they are to be disconnected. A further advantage of this invention is that there is positive sealing of the air passages at the junction of the inner and outer assemblies of the coupling apparatus. A still further advantage of this invention is that no connectors, either pneumatic or electrical, extend beyond the periphery of the connected assemblies.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:
1. An apparatus for connecting a tool or the like to a robot arm including:
an inner assembly;
means to attach said inner assembly to a robot arm;
an outer assembly;
said outer assembly including means for attachment to a tool or the like;
locking means to lock said outer assembly to said inner assembly;
said locking means including;
means slidably supported by said inner assembly;
first means to cause movement of said slidably supported means to move said slidably supported means to its locking position, said slidably supported means remaining in the locking position after said first means is rendered ineffective;
second means to cause movement of said slidably supported means to remove said slidably supported means from the locking position;
a plurality of balls surrounding said slidably supported means and supported by said inner assembly;
a cam locking ring supported by said outer assembly and having means cooperating with said balls to retain said balls to lock said outer assembly to said inner assembly when said first means of said locking means moves said slidably supported means to the locking position;
and resilient means supported by said inner assembly to move said balls out of retention by said cam locking ring when said second means of said locking means removes said slidably supported means from the locking position;
each of said inner assembly and said outer assembly having electrical means cooperating with each other to provide a plurality of electrical connections extending through said inner assembly and said outer assembly when said inner assembly and said outer assembly are locked to each other by said locking means;
and each of said inner assembly and said outer assembly having air passage means cooperating with each other to provide a plurality of air sealed passage means extending through said inner assembly and said outer assembly when said inner assembly and said outer assembly are locked to each other by said locking means.

2. The apparatus according to claim 1 in which said locking means includes:
ball retaining means supported by said inner assembly;
said ball retaining means supporting said balls for radial movement towards and away from said slidably supported means in a direction substantially perpendicular to the direction of movement of said slidably supported means;
and said ball retaining means supporting said resilient means.

3. The apparatus according to claim 2 in which:
said ball retaining means includes a plurality of radial passages, each of said radial passages having one of said balls supported therein;
and said resilient means is disposed at the outer end of each of said radial passages.

4. The apparatus according to claim 3 in which;
said resilient means comprises a plurality of resilient strips mounted on said ball retaining means;
said resilient strips being equal in number to the number of said radial passages;
and each of said resilient strips extends from one of said radial passages in said ball retaining means to an adjacent of said radial passages in said ball retaining means so that the outer end of each of said radial passages in said ball retaining means has an end of each of two of said resilient strips engaging said ball in said radial passage.

5. The apparatus according to claim 4 in which:
said inner assembly has a chamber;
said slidably supported means includes a piston movable in said chamber;
said first means of said locking means includes means to apply pressurized air to said piston to move said piston to the locking position;
and said second means of said locking means includes means to apply pressurized air to said piston to remove said piston from the locking position.

6. The apparatus according to claim 5 in which said air sealed passage means includes:
a plurality of passages extending through one of said inner assembly and said outer assembly;

a plurality of hollow elements extending through the other of said inner assembly and said outer assembly, each of said hollow elements having a passage extending therethrough and aligned with one of said passages in said one of said inner assembly and said outer assembly when said inner assembly and said outer assembly are locked to each other by said locking means;

each of said hollow elements being formed of a resilient material and having a portion extending beyond said other of said inner assembly and said outer assembly;

and each of said passages in said one of said inner assembly and said outer assembly having means to receive said extending portion of said hollow element when said inner assembly and said outer assembly are locked to each other by said locking means to form a seal therebetween so that a plurality of air sealed passages extends through said inner assembly and said outer assembly.

7. The apparatus according to claim 6 in which:
said one of said inner assembly and said outer assembly is said inner assembly;
and said other of said inner assembly and said outer assembly is said outer assembly.

8. The apparatus according to claim 4 in which said air sealed passage means includes:
a plurality of passages extending through one of said inner assembly and said outer assembly;
a plurality of hollow elements extending through the other of said inner assembly and said outer assembly, each of said inner hollow elements having a passage extending therethrough and aligned with one of said passages in said one of said inner assembly and said outer assembly when said inner assembly and said outer assembly are locked to each other by said locking means;
each of said hollow elements being formed of a resilient material and having a portion extending beyond said other of said inner assembly and said outer assembly;
and each of said passages in said one of said inner assembly and said outer assembly having means to receive said extending portion of said hollow element when said inner assembly and said outer assembly are locked to each other by said locking means to form a seal therebetween so that a plurality of air sealed passages extends through said inner assembly and said outer assembly.

9. The apparatus according to claim 8 in which:
said one of said inner assembly and said outer assembly is said inner assembly;
and said other of said inner assembly and said outer assembly is said outer assembly.

10. The apparatus according to claim 3 in which said air sealed passage means includes:
a plurality of passages extending through one of said inner assembly and said outer assembly;
a plurality of hollow elements extending through the other of said inner assembly and said outer assembly, each of said hollow elements having a passage extending therethrough and aligned with one of said passages in said one of said inner assembly and said outer assembly when said inner assembly and said outer assembly are locked to each other by said locking means;
each of said hollow elements being formed of a resilient material and having a portion extending beyond said other of said inner assembly and said outer assembly;
and each of said passages in said one of said inner assembly and said outer assembly having means to receive said extending portion of said hollow element when said inner assembly and said outer assembly are locked to each other by said locking means to form a seal therebetween so that a plurality of air sealed passages extends through said inner assembly and said outer assembly.

11. The apparatus according to claim 10 in which:
said one of said inner assembly and said outer assembly is said inner assembly;
and said other of said inner assembly and said outer assembly is said outer assembly.

12. The apparatus according to claim 2 in which said air sealed passage means includes:
a plurality of passages extending through one of said inner assembly and said outer assembly;
a plurality of hollow elements extending through the other of said inner assembly and said outer assembly, each of said hollow elements having a passage extending therethrough and aligned with one of said passages in said one of said inner assembly and said outer assembly when said inner assembly and said outer assembly are locked to each other by said locking means;
each of said hollow elements being formed of a resilient material and having a portion extending beyond said other of said inner assembly and said outer assembly;
and each of said passages in said one of said inner assembly and said outer assembly having means to receive said extending portion of said hollow element when said inner assembly and said outer assembly are locked to each other by said locking means to form a seal therebetween so that a plurality of air sealed passages extends through said inner assembly and said outer assembly.

13. The apparatus according to claim 12 in which:
said one of said inner assembly and said outer assembly is said inner assembly;
and said other of said inner assembly and said outer assembly is said outer assembly.

14. The apparatus according to claim 1 in which said air sealed passage means includes:
a plurality of passages extending through one of said inner assembly and said outer assembly;
a plurality of hollow elements extending through the other of said inner assembly and said outer assembly, each of said hollow elements having a passage extending therethrough and aligned with one of said passages in said one of said inner assembly and said outer assembly when said inner assembly and said outer assembly are locked to each other by said locking means;
each of said hollow elements being formed of a resilient material and having a portion extending beyond said other of said inner assembly and said outer assembly;
and each of said passages in said one of said inner assembly and said outer assembly having means to receive said extending portion of said hollow element when said inner assembly and said outer assembly are locked to each other by said locking means to form a seal therebetween so that a plurality of air sealed passages extends through said inner assembly and said outer assembly.

15. The apparatus according to claim 14 in which:
said one of said inner assembly and said outer assembly is said inner assembly;
and said other of said inner assembly and said outer assembly is said outer assembly.

16. The apparatus according to claim 1 in which:
said inner assembly has a chamber;
said slidably supported means includes a piston movable in said chamber;
said first means of said locking means includes means to apply pressurized air to said piston to move said piston to the locking position;
and said second means of said locking means includes means to apply pressurized air to said piston to remove said piston from the locking position.

17. An apparatus for connecting a tool or the like to a robot arm including:
an inner assembly;
means to attach said inner assembly to a robot arm;
an outer assembly;
said outer assembly including means for attachment to a tool or the like;
locking means to lock said outer assembly to said inner assembly;
each of said inner assembly and said outer assembly having electrical means cooperating with each other to provide a plurality of electrical connections extending through said inner assembly and said outer assembly when said inner assembly and said outer assembly are locked to each other by said locking means;
one of said inner assembly and said outer assembly having a plurality of passages extending therethrough;
the other of said inner assembly and said outer assembly having a plurality of hollow elements extending therethrough, each of said hollow elements having a passage extending therethrough and aligned with one of said passages in said one of said inner assembly and said outer assembly when said inner assembly and said outer assembly are locked to each other by said locking means;
each of said hollow elements being formed solely of a resilient material and having a portion extending beyond said other of said inner assembly and said outer assembly;
and each of said passages in said one of said inner assembly and said outer assembly having means to receive said extending portion of said hollow element when said inner assembly and said outer assembly are locked to each other by said locking means to form a seal therebetween so that a plurality of air sealed passages extends through said inner assembly and said outer assembly.

18. The apparatus according to claim 17 in which:
said one of said inner assembly and said outer assembly is said inner assembly;
and said other of said inner assembly and said outer assembly is said outer assembly.

19. The apparatus according to claim 17 in which:
each of said receiving means in said one of said inner assembly and said outer assembly is an enlarged conical shaped recess in said one of said inner assembly and said outer assembly adjacent said other of said inner assembly and said outer assembly, said recess being substantially larger at its maximum than said passage in said one of said inner assembly and said outer assembly;
and said extending portion of each of said hollow elements is a cone shaped end smaller than the remainder of said hollow element and disposed within one of said recesses in said one of said inner assembly and said outer assembly.

20. The apparatus according to claim 19 in which:
said one of said inner assembly and said outer assembly is said inner assembly;
said other of said inner assembly and said outer assembly is said outer assembly;
and each of said hollow elements includes:
a cylindrical portion extending from said cone shaped end;
and an enlarged end extending from said cylindrical portion remote from said cone shaped end and abutting said attachment means of said outer assembly.

* * * * *

UNITED STATES PATENT AND TRADEMARK OFFICE
CERTIFICATE OF CORRECTION

PATENT NO. : 4,696,524

DATED : September 29, 1987

INVENTOR(S) : William C. Cloyd

It is certified that error appears in the above-identified patent and that said Letters Patent is hereby corrected as shown below:

Column 1, line 17, "signal" should read -- signals --.

Column 6, line 45, after "under" insert -- the --.

Column 7, line 56, the "semi-colon (;)" should be a -- colon (:) --.

Column 8, line 43, the "semi-colon (;)" should be a -- colon (:) --.

Column 9, line 32, cancel "inner".

Signed and Sealed this

Fifth Day of April, 1988

Attest:

DONALD J. QUIGG

*Attesting Officer*    Commissioner of Patents and Trademarks

UNITED STATES PATENT AND TRADEMARK OFFICE
CERTIFICATE OF CORRECTION

PATENT NO. : 4,696,524

DATED : September 29, 1987

INVENTOR(S) : William C. Cloyd

It is certified that error appears in the above-identified patent and that said Letters Patent is hereby corrected as shown below:

Column 3, line 65, "piston" should read -- portion --.

Signed and Sealed this

Thirty-first Day of May, 1988

Attest:

DONALD J. QUIGG

Attesting Officer

Commissioner of Patents and Trademarks